S. N. SCHWARTZ.
MEANS FOR CONTROLLING HEADLIGHTS FOR AUTOMOBILES, &c.
APPLICATION FILED AUG. 31, 1914.
1,207,331.
Patented Dec. 5, 1916.
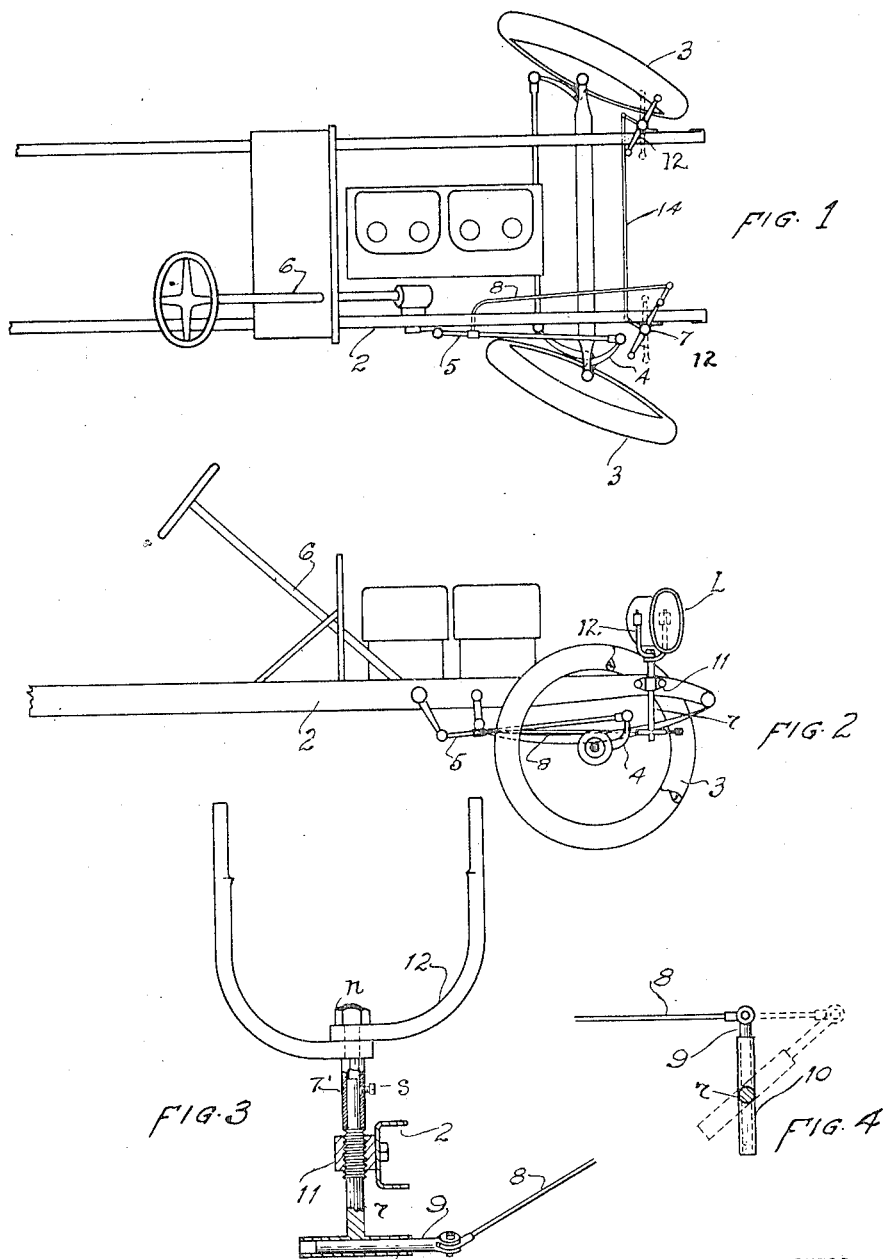
WITNESSES:
INVENTOR
Samuel N. Schwartz
BY
Fisher &
ATTORNEYS

UNITED STATES PATENT OFFICE.

SAMUEL N. SCHWARTZ, OF CLEVELAND, OHIO.

MEANS FOR CONTROLLING HEADLIGHTS FOR AUTOMOBILES, &c.

1,207,331.   Specification of Letters Patent.   Patented Dec. 5, 1916.

Application filed August 31, 1914.  Serial No. 859,283.

*To all whom it may concern:*

Be it known that I, SAMUEL N. SCHWARTZ, a citizen of the United States, residing at Cleveland, in the county of Cuyhago and State of Ohio, have invented certain new and useful Improvements in Means for Controlling Headlights for Automobiles, &c., of which the following is a specification.

This invention pertains to an improvement in means for controlling the head lights of automobiles and other power driven vehicles or machines, and the object of the invention is to provide a simple and effective automatic mechanism whereby the head lights are given their maximum rotation in making a turn to right or left while the front wheels are making their minimum turn in that direction, thus enabling me to throw a light at a sharp angle onto a cross street in advance of the machine and before a corresponding turn of the machine in that direction has been made. This has the advantage of revealing the possible condition of a street before it really is entered, and the flare of the light in the new direction serves also as a notice or warning to pedestrians on the crossing that the machine is turning in that direction. Of course, I am aware that a mechanism having these objects and capabilities is not broadly new, but the particular mechanism herein is both new and original so far as I know and believe, and has the obvious advantages of simplicity of construction and ease and positiveness of operation.

In the accompanying drawings, Figure 1 is a more or less diagrammatic plan view of a machine containing my improvement and showing the steering wheels and head light supports turned to the right, and Fig. 2 is a side elevation of the machine showing a like position of the parts with a head-light or lamp rotated to one side corresponding to Fig. 1. Fig. 3 is an elevation of the controlling mechanism partially sectioned and Fig. 4 is a plan view of the lower portion of Fig. 3 showing the limit of adjustment in dotted lines and the normal position in full lines, the latter corresponding substantially to the position shown in Fig. 3.

The invention as thus illustrated has its operating connections with the rod 5 which extends from the steering rod or shaft 6 to the arm 4 on the kunckle which carries the front wheel 3. This is the usual construction and the invention begins with the rod 8 which is connected with said rod 5 at one end and with a plunger 9 at the other end. The said plunger is slidably mounted in a barrel 10 rigid with the support or stem 7 for the head light and which is telescoped in a sleeve 7′ carrying the horns or arms 12 of the head light or lamp L. Specifically, the rod 8 is pivotally connected with the plunger 9, and the parts 7—10 together are of inverted T shape, the open ended barrel 10 being horizontally disposed at the bottom of the stem 7, and a thread about a portion of said stem 7 engages in a bracket nut 11 permanently fixed to the frame 2. The shank of the said stem 7 extends into the sleeve 7′ and is secured in any desired adjustment as to elevation or rotation by a set screw *s*. This or any equivalent connection between these parts may be used. The horns or arms 12 are fixed rigidly on said sleeve 7′ after adjustment by nut *n* thereon.

The operation contemplates a quick initial rotation of the head lights and a gradual decrease in the rate of rotation to the end thereof after the quick initial rotation is effected, with the object, as already stated, of anticipating the turn of a machine into a street crossing and getting the light out into the crossing before the machine has described a corresponding curvature in its course. This I have found can be easily accomplished by the means most plainly seen in Figs. 3 and 4 and wherein the center of the head light, represented by the parts 7 and 7′, is rotated by the differential action of the sliding plunger 9. Thus, having the parts in normal position, Fig. 3, and full lines Fig. 4, a forward thrust on the rod 8, which has its connection comparatively near the axis 7, 7′ will rotate the head light more than half its total rotation before the leverage through the plunger is appreciably increased, and it is in this initial arc of rotation of the barrel 10 by or through the plunger that the head light gets its turn onto the side street or crossing. A little farther along the rotation is greatly diminished and the plunger 9 slides outward from or in the said barrel, say to position in dotted lines, Fig. 4. The return to normal is the reverse of the foregoing and is less material and rights itself as the machine resumes a straight forward course. Rotation of the stem 7 of the head light occurs in the screw threaded bracket or nut 11, which also provides for raising or lowering the said stem more or less in said nut and further adjustment of the lamp as to elevation and rotation is provided in the telescopic connection shown.

The complete article of manufacture comprised in this invention includes the stem or support 7, 7' for the lamp, the differential mechanism at the bottom of said support and the link connection 8 and nut 11. This is the attachment which I bring to the head lights and the steering mechanism now in use, and the essential novelty resides in the means shown having a changing length of leverage by which I am enabled, first, to bring the fulcrum for operating said stem or support, comparatively close thereto in its normal position and thus get a short leverage and a consequent quick initial rotation of the light before said leverage is lengthened and the fulcrum moved outward onto a considerably larger arc by the sliding of the plunger outward at the expense of rotation. The said plunger and the barrel have such length that they will hold operating relations however short the steering wheels may turn, and the opposite light is reached by the cross rod or connection 14, which connects both lights as shown in Fig. 1.

The invention is also applicable to street cars having wheel trucks adapted to turn on a vertical axis and with which the attachment may have chain or rod connections, and therefore, the term vehicle is to be construed as including a street car as well as an automobile.

What I claim is:

In a lighting attachment for vehicles, a lamp support comprising an upper tubular section having a lamp bracket thereon and a T-shaped lower section having a stem extending into said upper section and on which said upper section is adjustable as to elevation and rotation and said lower section having a tubular head, a fixed nut in which said stem is rotatably supported and a plunger in said tubular head having linked connection with the steering mechanism of the vehicle.

In testimony whereof I affix my signature in presence of two witnesses.

SAMUEL N. SCHWARTZ.

Witnesses:
F. J. GREER,
R. B. MOSER.

Copies of this patent may be obtained for five cents each, by addressing the "Commissioner of Patents, Washington, D. C."